US010956240B2

(12) United States Patent
Sun et al.

(10) Patent No.: US 10,956,240 B2
(45) Date of Patent: Mar. 23, 2021

(54) SHARING DATA BY A VIRTUAL MACHINE

(71) Applicant: 2236008 Ontario Inc., Waterloo (CA)

(72) Inventors: Xiaoyong Sun, Kanata (CA); Mikhail Nefedov, Kanata (CA)

(73) Assignee: BlackBerry Limited, Waterloo (CA)

( * ) Notice: Subject to any disclaimer, the term of this patent is extended or adjusted under 35 U.S.C. 154(b) by 212 days.

(21) Appl. No.: 16/175,461

(22) Filed: Oct. 30, 2018

(65) Prior Publication Data

US 2020/0133703 A1 Apr. 30, 2020

(51) Int. Cl.
*G06F 9/54* (2006.01)
*G06F 3/06* (2006.01)
*G06F 9/455* (2018.01)

(52) U.S. Cl.
CPC ............ *G06F 9/544* (2013.01); *G06F 3/0604* (2013.01); *G06F 3/064* (2013.01); *G06F 3/067* (2013.01); *G06F 3/0647* (2013.01); *G06F 3/0656* (2013.01); *G06F 3/0664* (2013.01); *G06F 9/455* (2013.01); *G06F 9/45558* (2013.01); *G06F 9/54* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,447,935 B2 * | 5/2013 | Gao ...................... | G06F 9/5077 711/147 |
| 9,454,392 B2 | 9/2016 | Luxenberg et al. | |
| 10,572,288 B2 * | 2/2020 | Tian ........................ | G06F 9/544 |
| 2004/0215858 A1 | 10/2004 | Armstrong et al. | |
| 2005/0114855 A1 * | 5/2005 | Baumberger ....... | G06F 9/45558 718/1 |
| 2007/0288921 A1 * | 12/2007 | King ................... | G06F 9/45537 718/1 |

(Continued)

FOREIGN PATENT DOCUMENTS

GB  2519578 B  2/2016

OTHER PUBLICATIONS

Ren et al., "Shared-Memory Optimizations for Inter-Virtual Machine Communication", Feb. 2016, ACM Computing Surveys, vol. 48. (Year: 2016).*

(Continued)

*Primary Examiner* — Qing Yuan Wu
(74) *Attorney, Agent, or Firm* — Rowand LLP

(57) ABSTRACT

A memory block is provided that is shared between two endpoints. This first endpoint is either a host for a virtual machine or the virtual machine. The second endpoint is either the host or another virtual machine. The shared memory block includes a buffer, a post counter, and an acknowledgment counter. The block is employed for communicating data from the first endpoint to the second endpoint. Sending data to the second endpoint includes identifying the buffer as being currently owned by the first endpoint and storing data in the buffer. It is then detected that the acknowledgment counter is equal to the post counter. The post counter is then incremented to signal that data has been stored for receipt by the second endpoint. Receiving the data by the second endpoint includes detecting that the post counter has changed and then incrementing the acknowledgment counter to acknowledge receipt of the data.

17 Claims, 8 Drawing Sheets

(56) References Cited

U.S. PATENT DOCUMENTS

| | | | | |
|---|---|---|---|---|
| 2013/0339953 | A1* | 12/2013 | Wibling | G06F 12/109 |
| | | | | 718/1 |
| 2016/0224482 | A1* | 8/2016 | Murata | G06F 3/0659 |
| 2018/0150416 | A1* | 5/2018 | Kubala | G06F 5/14 |
| 2019/0286577 | A1* | 9/2019 | Leitao | G06F 12/1475 |

OTHER PUBLICATIONS

Pinto et al.: "A zero-copy shared memory framework for host-guest data sharing in KVM" 2016 Intl IEEE Conferences on Ubiquitous Intelligence & Computing, Advanced and Trusted Computing, Scalable Computing and Communications, Cloud and Big Data Computing, Internet of People, and Smart World Congress, Jul. 18-21, 2016.

Thornley et al.: "Monotonic Counters: a New Mechanism for Thread Synchronization", Department of Computer Science, University of Virginia, Charlottesville, Virginia 22903; Computer Science Department, California Institute of Technology, Pasadena, California, 91125, May 1-5, 2000.

Coviello: "VMShm, a mechanism for accessing POSIX shared memory from QEMU/kvm guests", https://coviello.wordpress.com/2010/11/16/vmshm-a-mechanism-for-accessing-to-posix-shared-memory-from-qemu-kvm-guests/, posted on Nov. 10, 2010, retrieved Oct. 30, 2018.

Wikipedia, "Circular Buffer" Jun. 11, 2016, XP055389817.

EPO, Extended European Search Report relating to EP Application 19201175.7 dated May 7, 2020.

* cited by examiner

SHARING DATA BY A VIRTUAL MACHINE

TECHNICAL FIELD

The present disclosure relates to virtual machines hosted by a physical host machine, and, more particularly, to sharing data by a virtual machine with another virtual machine or with the host machine.

BACKGROUND

A computing device may host one or more virtual machines. Virtual machines provide a duplicate of a real-world computing device. The hosting of virtual machines may be referred to as virtualization. Virtualization may be controlled by specialized software referred to as a hypervisor.

In some circumstances, it may be desirable for software executing on one virtual machine hosted by a particular computing device to communicate with another virtual machine hosted by that computing device or with the host of the virtual machine. Such communication may be performed using network communication techniques the same as or similar to techniques as may be employed for communications between physical computing devices. For example, a virtual machine may use a virtualized network adapter to communicate with other virtual machines as though they were both physical computing devices connected to the same network.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
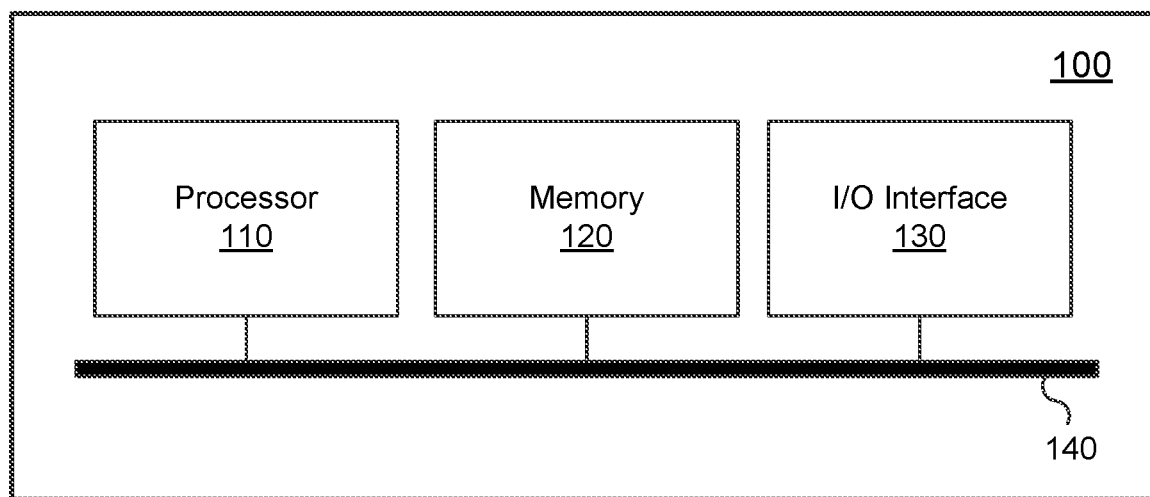
FIG. 1 shows a high-level block diagram of an example computing device of FIG. 1.

In one aspect, there may be provided a computer-implemented method. The method may include providing a memory block shared between a first endpoint and a second endpoint. The shared memory block may include a plurality of buffers, a posting buffer index, a post counter, and an acknowledgment counter. One of the first endpoint or the second endpoint may be a virtual machine hosted by a computing device. The other of the first endpoint or the second endpoint may be one of a host for the virtual machine, another virtual machine hosted by the computing device, or a host for the another virtual machine. The method may include sending, by the first endpoint, data to the second endpoint. The sending may include: identifying one of the at least one buffers as being currently owned by the first endpoint and storing data in that buffer; detecting that the acknowledgment counter is equal to the post counter; and following detecting that the acknowledgment counter is equal to the post counter, incrementing the post counter to signal that data has been stored for receipt by the second endpoint. The method may further include receiving, by the second endpoint, the data from the first endpoint. The receiving may include: detecting that the post counter has changed; and following detecting that the post counter has changed, incrementing the acknowledgment counter to acknowledge receipt of the data.

In this way, data may be shared between two virtual machines or between a virtual machine and a host or vice-versa. Notably, latency and/or overhead of so sharing data may be less than that associated with other techniques. For example, in contrast to, for example, network messaging, sharing data in this way may avoid or limit the need to serialize and deserialize data being shared into and from a defined format such as, for example, a wire format.

In some implementations, the at least one buffer may include a plurality of buffers and the shared memory block may further include a posting buffer index. It may be that sending, by the first endpoint, data to the second endpoint, further includes: following detecting that the acknowledgment counter is equal to the post counter and prior to incrementing the post counter, setting the posting buffer index to a value identifying the one of the buffers in which the data was stored. It may also then be that receiving, by the second endpoint, the data from the first endpoint further includes: following detecting that the post counter has changed, identifying, based on the posting buffer index, the one of the buffers as being the buffer storing data for receipt by the second endpoint.

In some implementations, it may also be that the shared memory block further includes a buffer ownership bitmap having bits identifying ownership of the plurality of buffers as between the first endpoint and the second endpoint and wherein identifying the one of the at least one buffers as being currently owned by the first endpoint includes determining, based on the buffer ownership bitmap, that the one of the at least one buffers is currently owned by the first endpoint. In some such implementations, the receiving may further include: prior to incrementing the acknowledgment counter, taking, by the second endpoint, ownership of the one of the at least one buffer by toggling the value of a bit of the buffer ownership bitmap corresponding to that buffer. Additionally, the second endpoint may after taking ownership of the one of the at least one buffers, processing the data stored in that buffer; and after completing processing of the data stored in the one of the at least one buffers, release ownership of the one of the at least one buffer to the first endpoint by toggling the value of the bit of the buffer ownership bitmap corresponding to that buffer.

In some implementations, the method may further include returning, by the second endpoint, ownership of a second one of the buffers to the first endpoint by toggling a value of a bit of the buffer ownership bitmap corresponding to the second one of the buffers.

In some implementations, the method may further include, prior to detecting that the acknowledgment counter is equal to the post counter, waiting for the acknowledgment counter to be equal to the post counter, and, while waiting for the acknowledgment counter to be equal to the post counter: identifying, based on the buffer ownership bitmap, a second one of the buffers owned by the first endpoint; and storing further data in the second one of the buffers.

In some implementations, the method may further include sending, by the first endpoint, further data to the second endpoint. That sending of the further data may include: identifying a second one of the buffers as being owned by the first endpoint; storing data in the second one of the buffers; detecting that the acknowledgment counter is equal to the post counter; following detecting that the acknowledgment counter is equal to the post counter: setting the posting buffer index to a value identifying the second one of the buffers; and incrementing the post counter to signal that data has been stored for receipt by the second endpoint. The method may further include receiving, by the second endpoint, the further data from the first endpoint. That receiving may include detecting that the post counter has changed; and following detecting that the post counter has changed, incrementing the acknowledgment counter to acknowledge receipt of the further data.

In some implementations, the shared memory block may further include a buffer ownership bitmap having bits identifying ownership of the plurality of buffers as between the first endpoint and the second endpoint. The receiving of the data may further include, prior to incrementing the acknowledgment counter, taking, by the second endpoint, ownership of the one of the at least one buffer by toggling the value of a bit of the buffer ownership bitmap corresponding to the one of the at least one buffer. Additionally, the receiving of the further data may include, prior to, incrementing the acknowledgment counter, taking, by the second endpoint, ownership of the second one of the buffers by toggling the value of a bit of the buffer ownership bitmap corresponding to the second one of the buffers. In some implementations, the method may further include, while the second one of the buffers is owned by the second endpoint, returning, by second endpoint, ownership of the one of the at least one buffer to the first endpoint by toggling a value of the bit of the buffer ownership bitmap corresponding to the one of the at least one buffer. Additionally or alternatively, in some implementations, the method may further include, while the one of the at least one buffers is owned by the second endpoint, returning, by second endpoint, ownership of the second of the buffers to the first endpoint by toggling a value of the bit of the buffer ownership bitmap corresponding to the second one of the buffers.

In some implementations, the at least one buffer may include only one buffer. It may be that that buffer is owned by the first endpoint when the acknowledgment counter is equal to the post counter. It may also be that that buffer is owned by the second endpoint when the post counter is greater than the acknowledgment counter.

In some implementations, it may be that detecting that the post counter has changed includes periodically polling the value of the post counter to determine whether the value of the post counter has changed.

In some implementations, the method may further include prior to detecting that the acknowledgment counter is equal to the post counter, waiting for the acknowledgment counter to be equal to the post counter. Waiting for the acknowledgment counter to be equal to the post counter may include periodically polling the value of the acknowledgment counter to determine whether the value of the acknowledgment counter has been incremented.

In another aspect, there may be provided a computer-implemented method. The method may include providing a memory block shared between a first virtual machine and a second virtual machine hosted by a computing device, the shared memory block including at least one buffer, a post counter, and an acknowledgment counter. The method may further include sending, by the first virtual machine, data to the second virtual machine. The sending may include: identifying one of the at least one buffers as being currently owned by the first virtual machine and storing data in that buffer; detecting that the acknowledgment counter is equal to the post counter; and following detecting that the acknowledgment counter is equal to the post counter, incrementing the post counter to signal that data has been stored for receipt by the second virtual machine. The method may further include receiving, by the second virtual machine, the data from the first virtual machine. The receiving may include: detecting that the post counter has changed; and following detecting that the post counter has changed, incrementing the acknowledgment counter to acknowledge receipt of the data.

In another aspect, there may be provided a computer system. The computer system may include at least one processor and a physical memory. The physical memory may store instructions that, when executed by the at least one processor, cause a first endpoint to communicate data to a second endpoint via a portion of the physical memory shared between the first endpoint and the second endpoint. The first endpoint may be one of a host for a virtual machine hosted by the computer system device or the virtual machine. The second endpoint may be one of the host or another virtual machine hosted by the computer system. The aforementioned portion of the physical memory may include, at least one buffer, a post counter, and an acknowledgment counter. The post counter may be incrementable by the first endpoint to signal to the second endpoint that data has been made available in one of the at least one buffers. The acknowledgment counter may be incrementable by the second endpoint to acknowledge signaling that data has been made available in one of the at least one buffers.

In some implementations, the at least one buffer may include a plurality of buffers and the portion of the physical memory may further include a posting buffer index and a buffer ownership bitmap. The posting buffer index may be modifiable by the first endpoint to indicate a particular one of the buffers in which data has been stored for communication to the second endpoint. The buffer ownership bitmap may store bits corresponding to the buffers, the bits identifying ownership of the plurality of buffers as between the first endpoint and the second endpoint.

In some implementation, the buffers are of a uniform size.

In some implementations, the data communicated by the first endpoint to the second endpoint is pixel data.

In another aspect, there may be provided a computer system. The computer system may include at least one processor and a physical memory. The physical memory may store instructions that, when executed by the at least one processor, cause the computer system to host a first virtual machine and a second virtual machine. The first virtual machine may communicate data to a second virtual machine via a portion of the physical memory shared between the first virtual machine and the second virtual machine. That portion of the physical memory may include, at least one buffer, a post counter, and an acknowledgment counter. The post counter may be incrementable by the first virtual machine to signal to the second virtual machine that data has been made available in one of the at least one buffers. The acknowledgment counter may be incrementable by the second virtual machine to acknowledge signaling that data has been made available in one of the at least one buffers.

In another aspect there may be provided a non-transitory computer-readable storage medium storing instructions that, when executed by a processor of a computer system, cause a first endpoint to send data to a second endpoint using a memory block shared between the first endpoint and the second endpoint, the first endpoint being one of a host for a virtual machine hosted by the computer system and the virtual machine and the second endpoint being one of the host and another virtual machine hosted by the computer system, and the shared memory block including at least one buffer, a post counter, and an acknowledgment counter, wherein sending the data includes: identifying one of the at least one buffers as being currently owned by the first endpoint and storing data in that buffer; detecting that the acknowledgment counter is equal to the post counter; and following detecting that the acknowledgment counter is equal to the post counter, incrementing the post counter to signal that data has been stored for receipt by the second endpoint, and wherein the medium further stores additional instructions that cause the second endpoint to receive the data from the first endpoint, wherein receiving the data includes: detecting that the post counter has changed; and following detecting that the post counter has changed, incrementing the acknowledgment counter to acknowledge receipt of the data.

In another aspect, there may be provided a non-transitory computer-readable storage medium storing instructions that, when executed by a processor of a computer system, cause a first virtual machine hosted by the computer system to send data to a second virtual machine hosted by the computer system using a memory block shared between the first virtual machine and the second virtual machine, the shared memory block including at least one buffer, a post counter, and an acknowledgment counter, wherein sending the data includes: identifying one of the at least one buffers as being currently owned by the first virtual machine and storing data in that buffer; detecting that the acknowledgment counter is equal to the post counter; and following detecting that the acknowledgment counter is equal to the post counter, incrementing the post counter to signal that data has been stored for receipt by the second virtual machine, and wherein the medium further stores additional instructions that cause the second virtual machine to receive the data from the first virtual machine, wherein receiving the data includes: detecting that the post counter has changed; and following detecting that the post counter has changed, incrementing the acknowledgment counter to acknowledge receipt of the data.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 shows a high-level block diagram of an example computing system.

In this example, the computing system comprises an example computing device 100. As illustrated, the example computing device 100 includes a processor 110, a memory 120, and an I/O interface 130. The foregoing modules of the example computing device 100 are in communication over a bus 140. As further described below, the example computing device 100 may host virtual machines.

The processor 110 includes a hardware processor and may, for example, include one or more processors using ARM, x86, MIPS, or PowerPC™ instruction sets. For example, the processor 110 may include Intel™ Core™ processors, Qualcomm™ Snapdragon™ processors, or the like. It may be that the processor 110 provides hardware support for virtualization. For example, the processor 110 may include one or more instructions and/or architectural features such as may be utilized by a hypervisor to control virtualization for hosting the virtual machines.

The memory 120 comprises a physical memory. The memory 120 may include random access memory, read-only memory, persistent storage such as, for example, flash memory, a solid-state drive or the like. Read-only memory and persistent storage are a computer-readable medium and, more particularly, may each be considered a non-transitory computer-readable storage medium. A computer-readable medium may be organized using a file system such as may be administered by software governing overall operation of the example computing device 100.

The I/O interface 130 is an input/output interface. The I/O interface 130 allows the example computing device 100 to receive input and provide output. For example, the I/O interface 130 may allow the example computing device 100 to receive input from or provide output to a user. In another example, the I/O interface 130 may allow the example computing device 100 to communicate with a computer network. The I/O interface 130 may serve to interconnect the example computing device 100 with one or more I/O devices such as, for example, a keyboard, a display screen, a pointing device like a mouse or a trackball, a fingerprint reader, a communications module or the like. Virtual counterparts of the I/O interface 130 and/or devices accessed via the I/O interface 130 may be provided such as, for example, by the hypervisor, to some or all of the virtual machines as may be hosted by the example computing device 100 under supervision of the hypervisor.

Software comprising instructions is executed by the processor 110 from a computer-readable medium. For example, software corresponding to a hypervisor and/or software corresponding to software being executed by a virtual machine may be loaded into random-access memory from persistent storage or flash memory of the memory 120. Additionally or alternatively, software may be executed by the processor 110 directly from read-only memory of the memory 120.

In another example, software may be accessed via the I/O interface 130.

As mentioned above, the example computing device 100 may host virtual machines.

Figure 2:
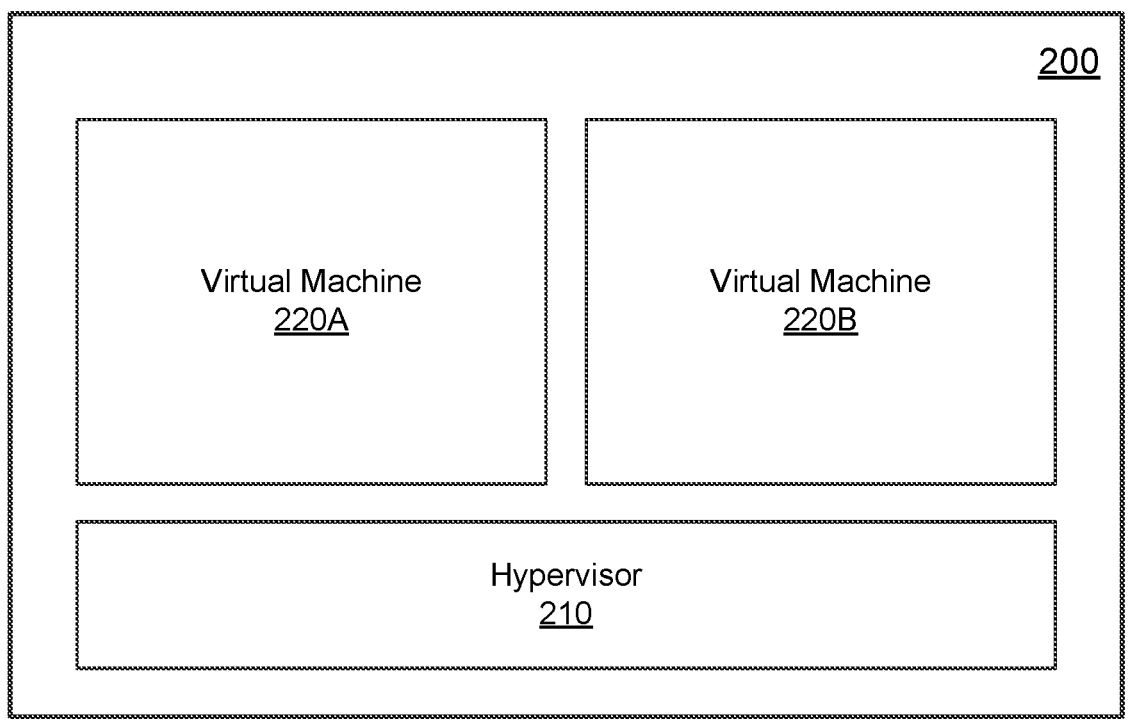
FIG. 2 shows an architectural diagram showing virtual machines such as may be hosted by the example computing device.

FIG. 2 provides an architectural diagram 200 showing virtual machines such as may be hosted by the example computing device 100.

As illustrated, a hypervisor 210 may supervise a group of virtual machines such as may be hosted by the example computing device 100. For example, as shown, the hypervisor 210 may supervise a first virtual machine 220A and a second virtual machine 220B. The hypervisor and/or other software executing on the example computing device 100 may be considered the host of the first virtual machine 220A and the second virtual machine 220B.

In some implementations, the hypervisor 210 may be a type 1 hypervisor running directly on the hardware of the example computing device 100. In a particular example, the hypervisor 210 may be the QNX™ Hypervisor. In other implementations, the hypervisor 210 may be a type 2 hypervisor running on some host operating system (not shown) that is in turn executing on the example computing device 100 and provides virtualization services.

Figure 3:
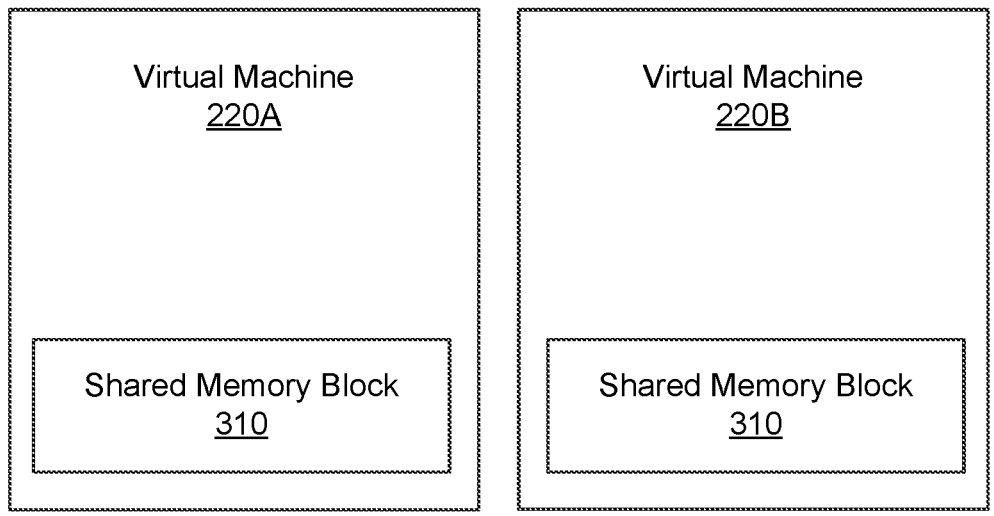
FIG. 3 shows a memory block shared between the virtual machines of FIG. 2.

Referring now to FIG. 3, a shared memory block 310 is provided. The shared memory block 310 may correspond to a particular portion of the memory 120. Additionally or alternatively, the shared memory block 310 may correspond to a particular portion of the virtual address space of the hypervisor 210. As depicted in FIG. 3, the shared memory block 310 is accessible from the address space of both the first virtual machine 220A and the second virtual machine 220B. As such, data stored in the shared memory block 310 by one or the other of the first virtual machine 220A and the second virtual machine 220B may be accessed and read by that one or the other of the first virtual machine 220A and the second virtual machine 220B. Stated differently, the shared memory block 310 may be a portion of physical memory (i.e., of the memory 120) access to which is shared by both the first virtual machine 220A and the second virtual machine 220B. As further described below, the shared memory block 310 is used for transmitting data between the first virtual machine 220A and the second virtual machine 220B.

Figure 4:
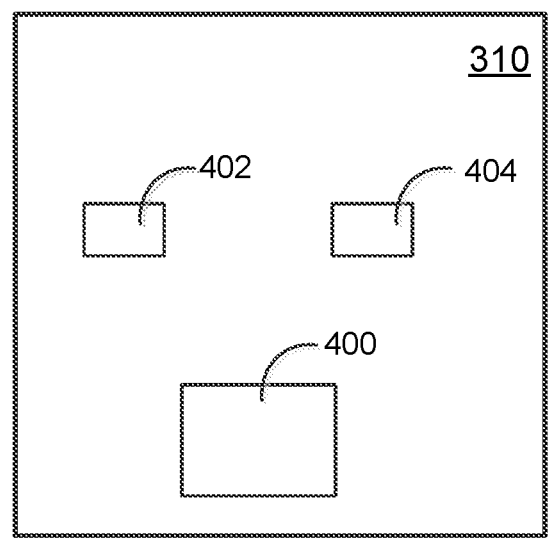
FIG. 4 shows an example data structure as may be stored in the shared memory block of FIG. 3.

FIG. 4 shows an example data structure as may be stored in the shared memory block 310. As illustrated, this example data structure may include a buffer 400, a post counter 402, and an acknowledgment counter 404.

The buffer 400 comprises a fixed-size buffer used for storing a defined amount of data. As further described below, the buffer 400 can be used to communicate data between the first virtual machine 220A and the second virtual machine 220B. More particularly, as further explained below, the buffer 400 may be accessed by the first virtual machine 220A for storing data being communicated to the second virtual machine 220B. The buffer may also be accessed by the second virtual machine 220B to retrieve the stored data, thereby allowing the communication of the data. Notably, this, in effect, defines a producer-consumer relationship between the first virtual machine 220A and the second virtual machine 220B, respectively.

The post counter 402 and the acknowledgment counter 404 are integer values. As further described below, the post counter 402 and the acknowledgment counter 404 are used to coordinate the above-mentioned storing by the first virtual machine 220A in the buffer 400 and the retrieving, by the second virtual machine 220B, of data so stored.

As further described below, in using the shared memory block 310 to exchange data, operations will be performed to access and mutate the post counter 402 and the acknowledgment counter 404. These operations are performed atomically with respect to the memory 120, and, more particularly, with respect to the portion of the memory 120 storing the post counter 402 and the acknowledgment counter 404. This may mean that those operations are performed using a single machine instruction of the processor 110 or otherwise without interruption by the other operations of the example computing device 100.

The post counter 402 and/or the acknowledgment counter 404 may, for example, be 32 or 64-bit integer counters. In some cases, the particular choice of width of the post counter 402 and the acknowledgment counter 404 may be based on a native full-word size of the example computing device 100. Additionally or alternatively, the type/size of the post counter 402 and the acknowledgment counter 404 may be based on the size(s) of integer for which features for perform operations atomically, such as, for example, specialized atomic operation instructions, are provided by the processor 110.

Prior to use, the shared memory block 310 may be initialized. For example, the shared memory block 310 may be zeroed. Notably, at least the post counter 402 and the acknowledgment counter 404 are initialized to zero.

As further described below, the post counter 402 is accessed (read) by both the first virtual machine 220A and the second virtual machine 220B, but during ordinary operation, is modified by the first virtual machine 220A but not the second virtual machine 220B. In particular, the first virtual machine 220A will, in defined circumstances, increment the post counter 402. By contrast, the acknowledgment counter 404 is accessed (read) by both the first virtual machine 220A and the second virtual machine 220B, but, during ordinary operation, is modified by the second virtual machine 220B but not the first virtual machine 220A. In particular, the second virtual machine 220B will, in defined circumstances, increment the acknowledgment counter 404.

The incrementing of the post counter 402 and the acknowledgment counter 404 will now be discussed. The post counter 402 is used by the first virtual machine 220A to signal to the second virtual machine 220B that data has been stored by the first virtual machine 220A in the buffer 400. The acknowledgment counter 404 is used by the second virtual machine 220B to signal to the first virtual machine 220A that the data stored in the buffer 400 has been retrieved by the second virtual machine 220B. The post counter 402 storing a value greater than the value of the acknowledgment counter 404 (and, in particular, the post counter 402 storing a value one higher than the acknowledgment counter 404) indicates that first virtual machine 220A has stored data in the buffer 400. After retrieving the data from the buffer 400, the second virtual machine increments the acknowledgment counter 404 (thereby making the value of the acknowledgment counter 404 equal to the value of the post counter 402) to acknowledge that the data stored in the buffer 400 has been retrieved by the second virtual machine 220B.

Figure 5:
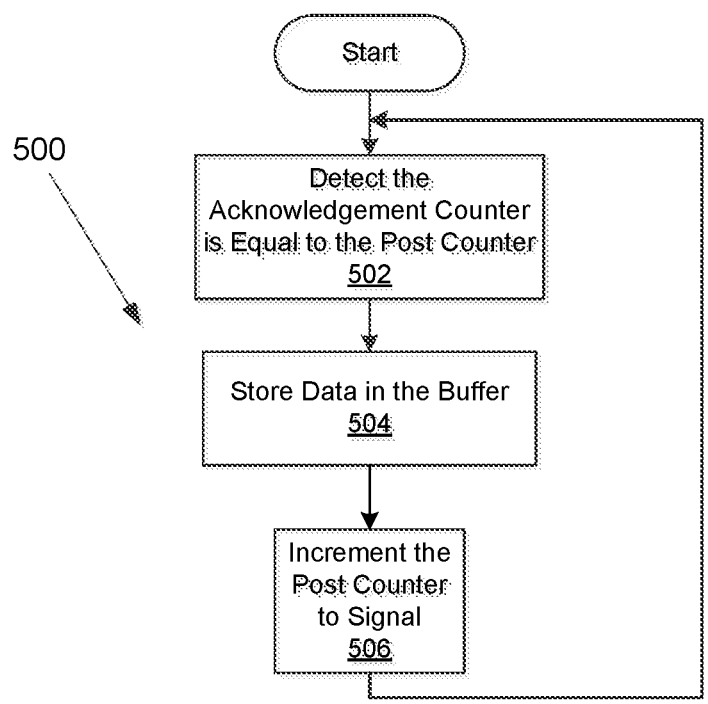
FIG. 5 provides a flow chart illustrating a method for sending data using the shared memory block of FIG. 4.

FIG. 5 provides a flow chart 500 illustrating a method including operations 502 and onward as may be performed by the example computing device 100, and, more particularly, by the processor 110 executing instructions in the context of a virtual processor of the first virtual machine 220A, so as to send data to the second virtual machine 220B by way of a shared memory block including the data structure of FIG. 4.

At the operation 502, the first virtual machine 220A determines that the value of the acknowledgment counter 404 is equal to the value of the post counter 402 meaning that the second virtual machine 220B has received the last data stored in the buffer 400 (or that the shared memory block 310 is in its initialized state). In effect, detecting this equality condition allows the first virtual machine to identify the buffer 400 as being owned by the first virtual machine 220A.

Detecting that the acknowledgment counter 404 is equal to the post counter 402 may be performed in a variety of fashions. In some implementations, the first virtual machine 220A may periodically inspect (i.e., poll) the acknowledgment counter 404 and the post counter 402 to determine whether they are equal. In other words, waiting for the acknowledgment counter 404 to be equal to post counter 402 may include periodically polling the value of the acknowledgment counter 404 to determine whether that value has been incremented. Additionally or alternatively, functionality of the hypervisor 210 and/or of the underlying example computing device 100 may be employed or utilized in detecting this condition. For example, in some implementations, such functionality may allow the first virtual machine 220A to receive an interrupt or callback when the acknowledgment counter 404 has a value equal to the value of the post counter 402.

Next, after identifying the buffer 400 as being owned by the first virtual machine 220A, at an operation 504, the first virtual machine 220A stores data in the buffer 400, that data being sent by the first virtual machine 220A to the second virtual machine 220B.

Then, following the detection that the value of the acknowledgment counter 404 is equal to the value of the post counter 402 and following the storing of data in the buffer 400, at an operation 506, the post counter 402 is incremented to signal that data has been stored in the buffer 400 for receipt by the second virtual machine 220B.

After the operation 506, the first virtual machine 220A may prepare for sending a next communication to the second virtual machine 220B using the buffer 400. For example, control flow may return to the operation 502 where the last communication having been received by the second virtual machine 220B may be detected.

Figure 6:
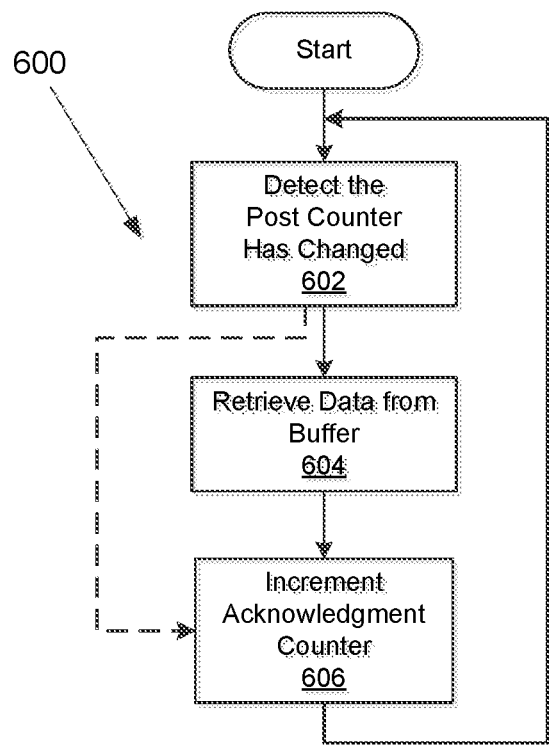
FIG. 6 provides a flow chart illustrating a method for receiving data using the shared memory block of FIG. 4.

A complementary method to the method of FIG. 5, the complementary method for receiving of data stored in the buffer 400, will now be described with reference to FIG. 6. FIG. 6 provides a flow chart 600 illustrating a method including operations 602 and onward as may be performed by the example computing device 100, and, more particularly, by the processor 110 executing instructions in the context of a virtual processor of the second virtual machine 220B, so as to receive data from the first virtual machine 220A using the shared memory block 310.

First, at the operation 602, the second virtual machine 220B detects that the value of the post counter 402 has changed. More particularly, the second virtual machine 220B may detect that the post counter 402 has assumed a value one greater than the value of the acknowledgment counter 404. (If the post counter 402 assumes a value more than one greater than the acknowledgment counter 404, this could be considered an error condition.)

Detecting that the value of the post counter 402 has changed may be performed in a variety of fashions. Such a condition may be detected in manners similar to manners in which it may be detected that the acknowledgment counter 404 is equal to the post counter 402 as discussed above. For example, the second virtual machine 220B may poll the post counter 402. In other words, detecting that the post counter 402 has changed may include periodically polling the value of the post counter to determine whether that value has changed. Additionally or alternatively, functionality of the hypervisor 210 and/or of the underlying example computing device 100 may be utilized so as to provide the second virtual machine 220B with some manner of notification or callback that a change in the value of the post counter 402 has occurred. In a particular example, a trap on writes to the memory location storing the post counter 402 may be set in the hypervisor 210. In the host that is hosting the first virtual machine 220A and the second virtual machine 220B (e.g., in the hypervisor 210), a message may be received in a handler whenever a write is made to the location in the memory 120 storing the post counter 402. The write may then be accepted and then a notification or callback as mentioned above may be generated for the second virtual machine 220B to notify that the post counter 402 has changed.

Next, following detecting that the post counter 402 has changed, at an operation 604, data may be retrieved from the buffer 400 by the second virtual machine 220B, thereby retrieving the data sent by the first virtual machine 220A.

Then, following retrieving of the data from the buffer 400, at an operation 606, the acknowledgment counter 404 is incremented to acknowledge receipt of that data.

Alternatively, following detecting that the post counter 402 has changed, the second virtual machine 220B may forgo receipt of that data (effectively skipping or dropping the communication) by processing directly from the operation 602 to acknowledging receipt of the data by incrementing the acknowledgment counter 404 at the operation 606.

After the operation 606, the second virtual machine 220B may prepare for receiving a next communication from the first virtual machine 220A using the buffer 400. For example, control flow may return to the operation 602 where the sending a next communication by the first virtual machine 220A may be detected.

Conveniently, the above-discussed methods may allow data to be communicated by the first virtual machine 220A to the second virtual machine 220B without employing a lock or mutex.

As noted above, the above-discussed methods utilize a single buffer. Notably, because of this, a further message cannot be readied in the shared memory block 310 by the first virtual machine 220A for sending until the last message it sent has been acknowledged by the second virtual machine 220B. This is because the buffer 400 cannot be modified until the acknowledgment is received, the acknowledgment effectively returning control of the buffer from the second virtual machine 220B to the first virtual machine 220A. Furthermore, because with the acknowledgment control of the buffer is returned by the second virtual machine 220B to the first virtual machine 220A, the second virtual machine 220B cannot acknowledge receipt of the data until it has completed processing of the data in the buffer (which, if processing takes some time, could limit throughput of communication through the shared memory block 310) or until it has copied the data to some other area of memory (which adds overhead and may limit throughput of data processing).

In some implementations, the shared memory block 310 may include multiple buffers. Methods for communicating data where the shared memory block 310 includes multiple buffers will now be described with reference to FIGS. 7-9 and FIGS. 10A-10D.

Figure 7:
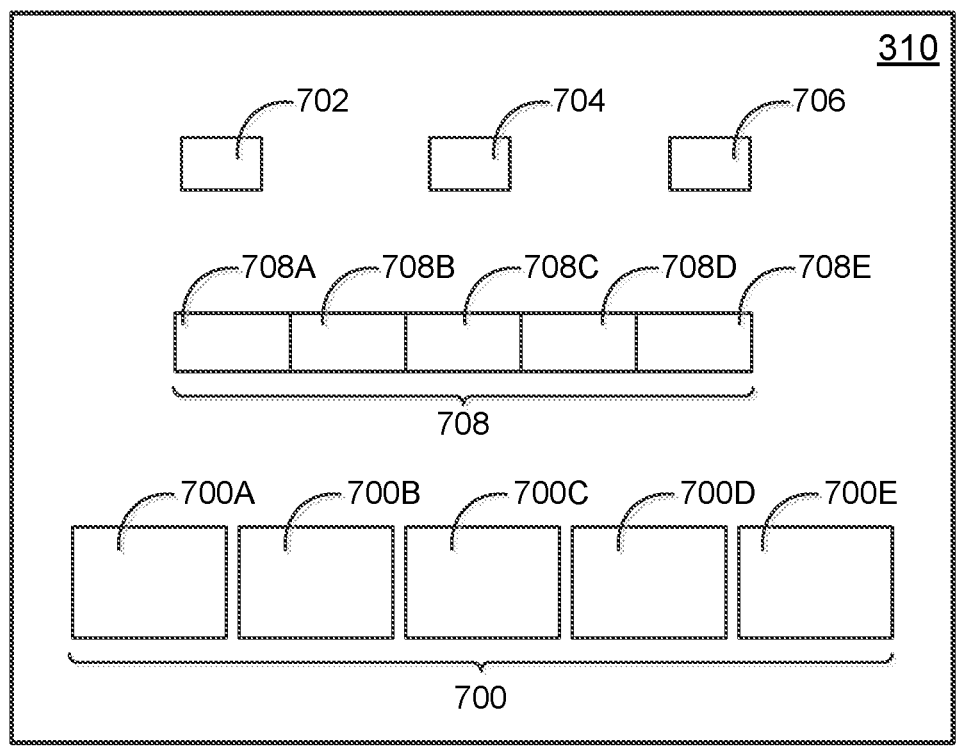
FIG. 7 shows another example data structure as may be stored in the shared memory block of FIG. 3.

FIG. 7 shows another example data structure as may be stored in the shared memory block 310.

As illustrated, this example data structure may include a set of buffers 700, a post counter 702, an acknowledgment counter 704, a posting buffer index 706, and a buffer ownership bitmap 708.

The set of buffers 700 includes more than one buffer used for communication between the first virtual machine 220A and the second virtual machine 220B. In some implementations, each of the buffers may be of the same size (i.e., the buffers may all be of a uniform size). Alternatively, it may be that some of the buffers are of different sizes. As illustrated, in some implementations, the set of buffers 700 may include five buffers, namely, a buffer 700A, a buffer 700B, a buffer 700C, a buffer 700D, and a buffer 700E.

The post counter 702 and the acknowledgment counter 704 are analogous to the post counter 402 (FIG. 4) and the acknowledgment counter 404, respectively, and serve similar purposes to the post counter 402 and the acknowledgment counter 404. Further the post counter 702 and the acknowledgment counter 404 are integer values that are accessed atomically, the size of which may be selected taking into account similar considerations to the post counter 402 and the acknowledgment counter 404 (e.g., having sizes matching hardware atomic operation support). For example, the post counter 702 is incrementable by the first virtual machine 220A to signal to the second virtual machine 220B that data has been made available in one of the set of buffers 700 and the acknowledgment counter 704 is incrementable by the second virtual machine 220B to acknowledge the signaling that data has been made available in one of the buffers.

The posting buffer index 706 is an integer. As further described below, the posting buffer index 706 is used to identify which buffer of the set of buffers 700 is being used in the context of sending a particular communication of data from the first virtual machine 220A to the second virtual machine 220B. More particular, the posting buffer index 706 is modified by the first virtual machine 220A to indicate a particular one of the buffers of the set of buffers 700 in which data has been stored for communication to the second virtual machine 220B in the context of a particular communication.

Bits of the buffer ownership bitmap 708 correspond to buffers of the set of buffers 700. For example, it could be that the buffer 700A corresponds a bit 708A, the buffer 700B corresponds a bit 708B, the buffer 700C corresponds a bit 708C, the buffer 700D corresponds a bit 708D, and the buffer 700E corresponds a bit 708E.

The buffer ownership bitmap 708 include bits identifying ownership of each buffer of the set of buffers 700 as between the first virtual machine 220A and the second virtual machine 220B. A particular value of the bit 708A may indicate that the buffer 700A is owned by the first virtual machine 220A and the inverse value may indicate that the buffer 700A is owned by the second virtual machine 220B (and so and so forth for the bits 708B-708E and the buffers 700B-700E). For example, assignment of a zero value to a given one of the bits may indicate ownership by the first virtual machine 220A while a unity value (one) for that bit may indicate ownership by the second virtual machine 220B or vice-versa. Prior to first use, the buffer ownership bitmap 708 may be initialized. For example, the buffer ownership bitmap 708 may be initialized as a part of the initialization of the shared memory block 310. The buffer ownership bitmap 708 may be initialized with values indicating that each buffer of the set of buffers 700 is owned by the first virtual machine 220A (as at that point no data has yet been sent). For example, where a zero value indicates ownership by the first virtual machine 220A, the buffer ownership bitmap 708 may be zeroed to initialize it, potentially as a part of a zeroing of the entirety of the shared memory block 310 during initialization thereof.

In some implementations, the buffer ownership bitmap 708 may be a bitfield such as may be represented be represented by bits of an integer. For example, where a 64-bit integer is used to represent the buffer ownership bitmap 708 (i.e., as a bitfield), such a representation may allow ownership of up to 64 buffers to be recorded.

As further described below, the post counter 702 is accessed (read) by both the first virtual machine 220A and the second virtual machine 220B, but during ordinary operation, is modified by the first virtual machine 220A but not the second virtual machine 220B. In particular, the first virtual machine 220A will, in defined circumstances explained below, increment the post counter 702. By contrast, the acknowledgment counter 704 is accessed (read) by both the first virtual machine 220A and the second virtual machine 220B, but, during ordinary operation, is modified by the second virtual machine 220B but not the first virtual machine 220A. In particular, the second virtual machine 220B will, in defined circumstances explained below, increment the acknowledgment counter 704.

The incrementing of the post counter 702 and the acknowledgment counter 704 will now be discussed. The post counter 702 is used by the first virtual machine 220A to signal to the second virtual machine 220B that data has been stored by the first virtual machine 220A in one of the buffers 700. As further described below, the one of the buffers 700 is identified using the posting buffer index 706. The acknowledgment counter 404 is used by the second virtual machine 220B to acknowledge receipt of the data in the identified one of the buffers to the first virtual machine 220A. As further described below, prior to so acknowledging, the second virtual machine 220B will either take ownership of that buffer or, if the second virtual machine 220B is foregoing receipt of that data (e.g., skipping a given that communication) then it may simply proceed to acknowledging without taking ownership of that one of the buffers.

Figure 8:
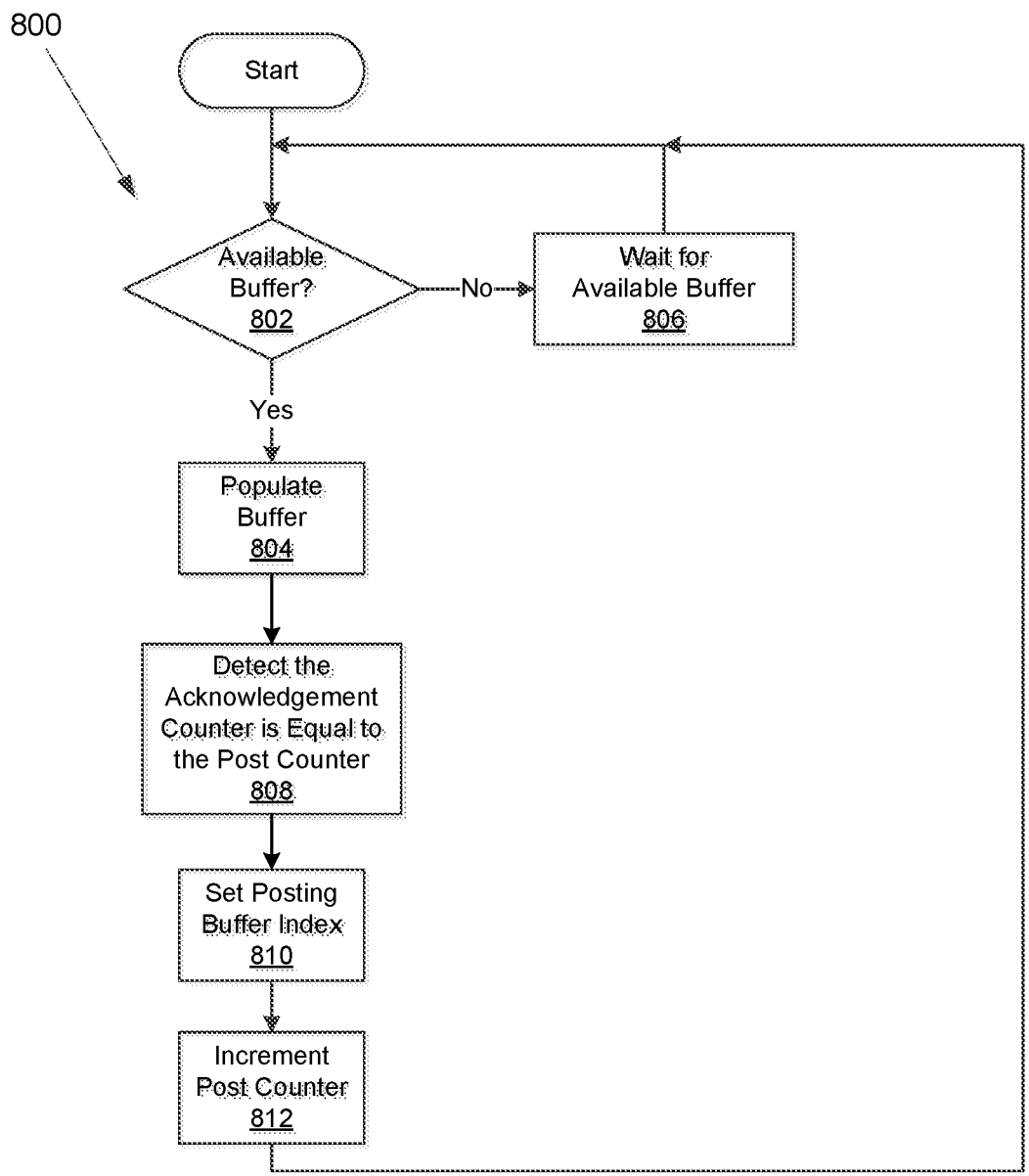
FIG. 8 provides a flow chart illustrating another method for sending data using the shared memory block of FIG. 7.

FIG. 8 provides a flow chart 800 illustrating a method including operations 802 and onward as may be performed by the example computing device 100, and, more particularly, by the processor 110 executing instructions in the context of a virtual processor of the first virtual machine 220A, so as to send data to the second virtual machine 220B by way of a shared memory block including the data structure of FIG. 7.

At the operation 802, it is determined whether there is an available buffer of the set of buffers 700. In particular, if a buffer of the set of buffers is currently owned by and thus available for use by the first virtual machine 220A, then an operation 804 is next. Alternatively, if there is no available buffer, then an operation 806 may follow. The operation 806 waits for one of the buffers of the set of buffers 700 to become available (e.g., by periodic polling and/or by some other mechanism) before then proceeding again to the operation 802.

If, however, one of the buffers of the set of buffers 700 is identified as being currently owned by the first virtual machine 220A, then, at the operation 804, data to be sent to the second virtual machine 220B is stored in the identified buffer by the first virtual machine 220A.

Following the operation 804, at an operation 808, the first virtual machine 220A determines that the value of the acknowledgment counter 704 is equal to the value of the post counter 702 meaning that the second virtual machine 220B has received and acknowledged conveyance of data by way of the set of buffers 700 (or that the shared memory block 310 is in its initialized state). In effect, detecting this condition allows the first virtual machine 220A to determine that the shared memory block 310 is in a state in which another transfer of data can be signalled.

Detecting that the acknowledgment counter 704 is equal to the post counter 702 may be performed in a variety of fashions such as, for example, in fashions discussed above for detecting that the acknowledgment counter 404 (FIG. 4)

is equal to the post counter 402 in relation to the operation 502 (FIG.) of the flow chart 500.

Following detecting that the acknowledgment counter 704 is equal to the post counter 702, at an operation 810, the posting buffer index is set to a value identifying the particular buffer of the set of buffers 700 in which the data was stored (i.e., the buffer identified at the operation 802). In a particular example, a zero-based numbering of buffers could be utilized and it may be that a value of 0 stored in the post counter 702 identifies that the buffer 700A was utilized, a value of 1 identifies that the buffer 700B was utilized and so on and so forth through to a value of 4 identifying that the buffer 700E was utilized.

Next, following setting the posting buffer index, the post counter 702 is incremented at an operation 812 so as to signal that data has been stored for receipt by the second virtual machine 220B in the one of the set of buffers 700 identified by the posting buffer index 706.

After the operation 506, the first virtual machine 220A may prepare for sending a next communication to the second virtual machine 220B using a buffer of the set of buffers 700. For example, control flow may return to the operation 802 where an available buffer may again be identified. Notably, in contrast to the method of FIG. 5, because there is more than one buffer in the set of buffers 700, so long as one of those buffers is currently owned by the first virtual machine 220A, then it is possible to populate a further buffer for sending as a subsequent communication before it is detected that the acknowledgment counter 704 is equal to the post counter 702. Moreover, in some implementations, while waiting for such a condition to be achieved, the first virtual machine 220A may continue to populate others of the set of buffers 700 with data to be sent to the second virtual machine 220B (in subsequent communications) provided that there are available buffers owned by the first virtual machine 220A.

Figure 9:
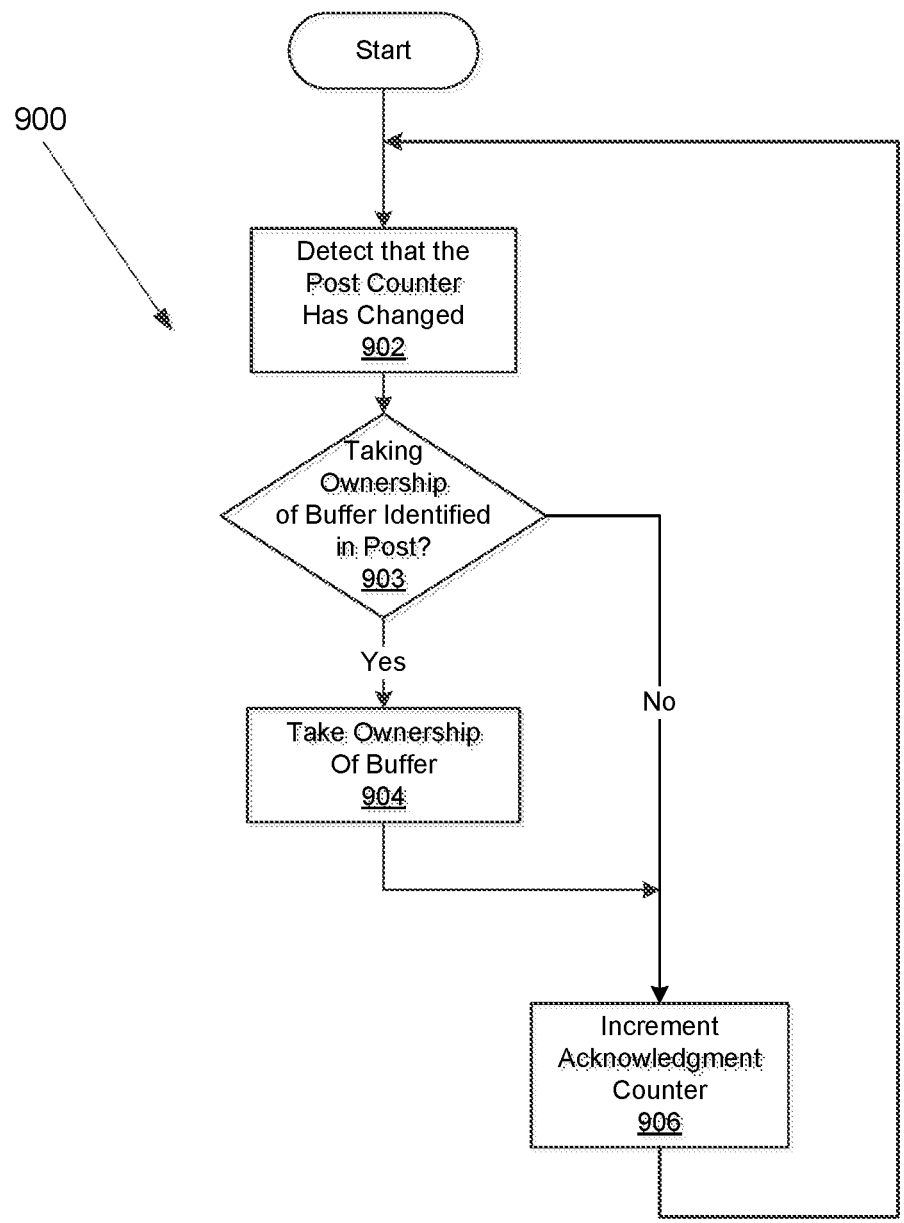
FIG. 9 provides a flow chart illustrating another method for receiving data using the shared memory block of FIG. 7.

A complementary method to the method of FIG. 8 for receiving of data stored in the set of buffers 700, will now be described with reference to FIG. 9. FIG. 9 provides a flow chart 900 illustrating a method including operations 902 and onward as may be performed by the example computing device 100, and more particularly, by the processor 110 executing instructions in the context of a virtual processor of the second virtual machine 220B so as to receive data from the first virtual machine 220A using the shared memory block 310.

First, at the operation 902, the second virtual machine 220B detects that the value of the post counter 702 has changed. More particularly, the second virtual machine 220B may detect that the post counter 702 has assumed a value one greater than the value of the acknowledgment counter 704. (If the post counter 702 assumes a value more than one greater than the acknowledgment counter 704, this could be considered an error condition.)

Detecting that the value of the post counter 702 has changed may be performed in a variety of fashions. Such a condition may be detected in manners similar to manners in which it may be detected that the post counter 402 (FIG. 4) has changed as discussed above. For example, the second virtual machine 220B may poll the post counter 702. Additionally or alternatively, functionality of the hypervisor 210 and/or of the underlying example computing device 100 may be utilized so as to provide the second virtual machine 220B with some manner of notification or callback that a change in the value of the post counter 402 has occurred.

The operations performed following detecting that the post counter 702 has changed will vary depending on whether the second virtual machine 220B will be taking ownership of the buffer used for conveying the data in relation to the notification being handled (the buffer identified by the posting buffer index 706). A determination of whether or not ownership of the buffer will be taken by the second virtual machine may be made at an operation 903. If the second virtual machine 220B will be taking ownership of the buffer, then an operation 904 is next. If not, an operation 906 is next.

At the operation 904, the second virtual machine 220B takes ownership of the particular buffer used for conveying data in relation to the notification being handled (the buffer identified by the posting buffer index 706). The second virtual machine 220B may take ownership of that buffer by toggling the value of a bit of the buffer ownership bitmap 708 corresponding to that buffer. For example, if a zero-based indexing scheme is being employed as described above, it could be that where the posting buffer index 706 has a value of 2, then the bit 708C will be toggled. Such toggling may, for example, cause the bit 708C to be set to one (i.e., where zero indicates ownership of the corresponding buffer by the first virtual machine 220A and where one indicates ownership of the corresponding buffer by the second virtual machine 220B).

Following the operation 904 or, if ownership of the relevant buffer is not being taken by the second virtual machine 220B, then following the operation 902, an operation 906 is next.

At the operation 906, the acknowledgment counter 704 is incremented to acknowledge receipt of the data.

After the operation 906, the second virtual machine 220B may prepare for receiving a next communication from the first virtual machine 220A using the set of buffers 700. For example, control flow may return to the operation 902 where a next communication having been sent by the first virtual machine 220A may be detected.

Notably, once the second virtual machine 220B completes processing of the data stored in a given buffer that the second virtual machine 220B took ownership of in order to process a particular communication, the second virtual machine 220B can release ownership of that buffer back to the first virtual machine 220A (e.g., for reuse) by toggling the value of the bit of the buffer ownership bitmap 708 corresponding to that buffer (e.g., by changing the value of that bit from one to zero). Notably, this return is not constrained by either the post counter 702 or the acknowledgment counter 704. In other words, the second virtual machine 220B may effectively "randomly" (both in terms of timing and in turns of ordering) return ownership of various buffers of the set of buffers 700 to the first virtual machine 220A as it has occasion to do so (e.g., after it completes processing of data stored therein). By contrast, such a random (e.g., out of order) return would not be possible if other structures such as, for example, ring buffers are employed.

Furthermore, it is notable that the methods illustrated in FIGS. 8 and 9 maintain the advantages of being lock-free as were discussed above in relation to the methods illustrated in FIGS. 5 and 6 while also providing the benefits of allowing additional buffers to be used. For example, additional buffers may allow processing of buffer data to be asynchronous with the communication and return of those buffers to be random as mentioned above.

It is also noted that the second virtual machine 220B could have multiple consumer threads processing data received via the shared memory block 310. Notably, random buffer return may facilitate such a multithreaded consumer model as there is no need to coordinate return of buffers amongst such threads.

It is noted that each of the post counter 702 and the acknowledgment counter 704 is set to a zero value at start-up and is then monotonic increasing thereafter.

As mentioned above, it could be that various error conditions are detected (e.g., the post counter 702 and the acknowledgment counter 704 becoming "out of sync" such as, for example, due to an implementation defect). It is also possible that an error condition could occur where, after some time out (e.g., in the operation 806 (FIG. 8)), no buffers are available to the first virtual machine 220A. Additionally or alternatively, there could be a time out waiting for the acknowledgment counter 704 to become equal to the post counter 702 (e.g., in the operation 808 (FIG. 8)). In such cases, the fact that a zero value of the post counter 702 and the acknowledgment counter 704 represents a start-up condition may be used in providing the ability to reset the shared memory block 310 (and communication therethrough). In support of such a reset operation, the implementation of the increment of each if the post counter 702 and the acknowledgment counter 704 may be so as to ensure that if an overflow of occurs, the value wraps to one, skipping the zero value.

Where reset is indicated, the first virtual machine 220A resets at least the post counter 702 and the acknowledgment counter 704 to zero. Furthermore, the first virtual machine 220A also takes ownership of all of the buffers of the set of buffers 700 by resetting the buffer ownership bitmap 708. For example, where the convention is that bits of the buffer ownership bitmap 708 are set to zero to indicate that corresponding buffers are owned by the first virtual machine 220A, the buffer ownership bitmap may be zeroed. Notably, this reset operation is a special case in which the first virtual machine 220A writes to the acknowledgment counter 704 and the buffer ownership bitmap 708 (whereas during ordinary operation the first virtual machine 220A only ever reads from those fields). Reset by the first virtual machine 220A may assume that the second virtual machine 220B has exited, been terminated, or is otherwise not running. If, however, this assumption is violated, the second virtual machine 220B should detect the resetting operation (e.g., based on the value of the post counter 702 becoming zero) and act accordingly. The values of the aforementioned time outs may be selected to avoid unnecessary resetting during normal operation.

An example of communicating data using the shared memory block 310 where it holds a data structure in accordance with FIG. 7 and where the communication is performed in accordance with the methods of FIGS. 8 and 9 will now be discussed with reference to FIGS. 10A-10D.

Figure 10A:
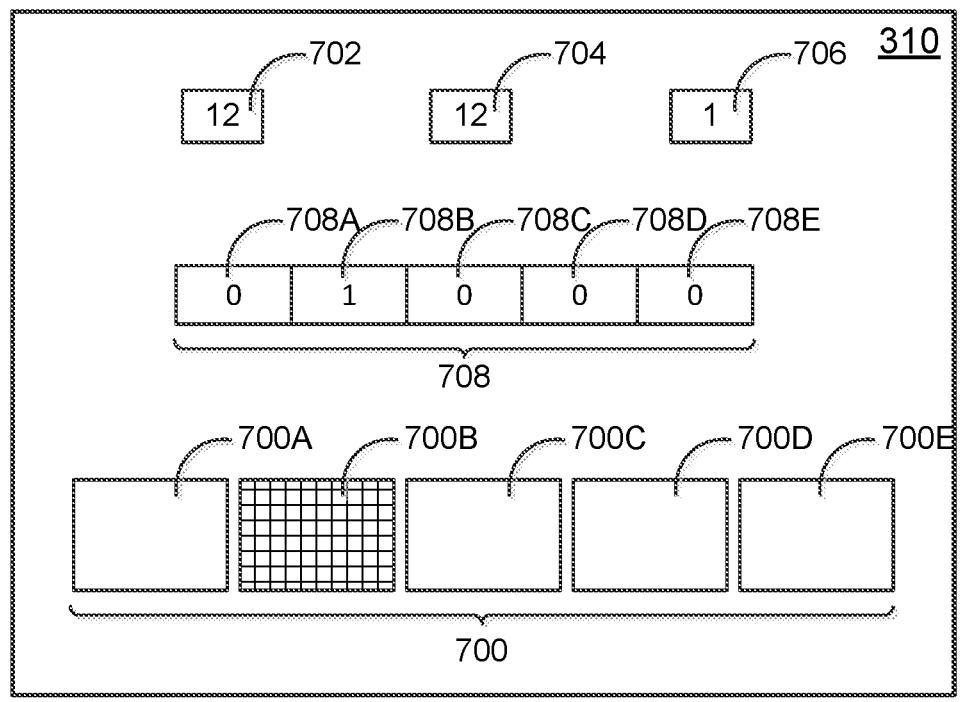
FIGS. 10A-10D show how data may be stored in the example data structure of FIG. 7 when sharing data in accordance with the methods of FIGS. 8 and 9.

FIG. 10A shows how data may be stored in the example data structure of FIG. 7. At the state in FIG. 10A, the last communication by the first virtual machine 220A has been acknowledged by the second virtual machine 220B and, therefore, the post counter 702 has a value (12) equal to the value (12) of the acknowledgment counter 704.

The depictions of FIGS. 10A-10D use a zero-based representation for the posting buffer index 706 and a representation where zero values in the buffer ownership bitmap 708 indicate that corresponding ones of the buffers 700 are owned by the first virtual machine 220A and where unity (one) values in the buffer ownership bitmap 708 indicate that corresponding ones of the buffers 700 are owned by the second virtual machine 220B.

In FIG. 10A, the posting buffer index 706 has a value, presumably left over from the last communication of 1, indicating the buffer 700B. Further, the bit 708B has a value of one meaning that it is owned by the second virtual machine 220B, presumably because the second virtual machine 220B took ownership of the buffer 700B further to receiving that last communication.

It may be that another communication is to be sent to the second virtual machine 220B by the first virtual machine 220A. The first virtual machine 220A may, as in the operation 802 (FIG. 8) described above, check for an available buffer (i.e. one of the buffers of the set of buffers 700 that is currently owned by the first virtual machine 220A). Referring to values in the buffer ownership bitmap 708 as shown in FIG. 10A, the buffer 700A may be identified as available based on the bit 708A having a zero value.

Figure 10B:
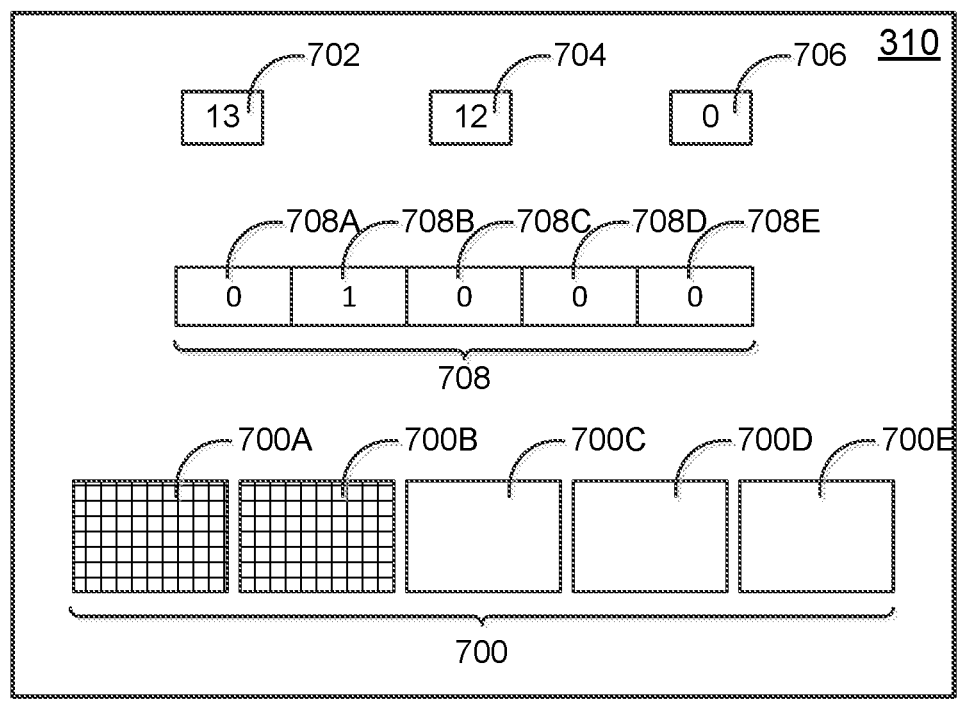

The first virtual machine 220A may store data in the buffer 700A as was described with respect to the operation 804 above. As noted above, in FIG. 10, the value of acknowledgment counter 704 is equal to the value of the post counter 702. As such, the first virtual machine 220A may then detect that the acknowledgment counter 704 is equal to the value of the post counter 702 as in the operation 808 above. The posting buffer index 706 may then, as was described with respect to the operation 810 above, be set to a value of 0 to indicate that the data was stored in the buffer 700A. After that, the post counter 702 may be incremented to signal that data has been stored for receipt by the second virtual machine 220B as explained in relation to the operation 812 above. The effect of these various operations on the shared memory block 310 as depicted in FIG. 10A is depicted in FIG. 10B.

Figure 10C:
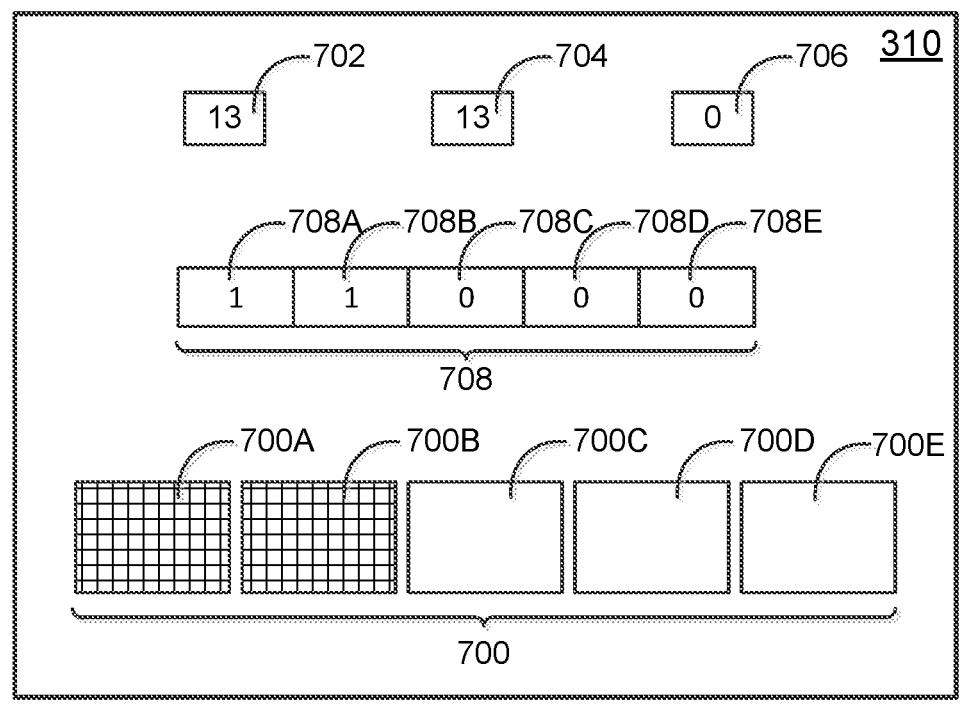

Considering now the receipt of the communication by the second virtual machine 220B, following the increment of the post counter 702 described above, the second virtual machine 220B may detect that change in the post counter 702 as described above in relation to the operation 902 (FIG. 9). It may be that the second virtual machine 220B takes ownership of the relevant buffer, namely the buffer 700A. As such, the second virtual machine 220B may take ownership of that buffer by toggling the bit 708A as described above in relation to the operation 904. Following that, the second virtual machine 220B may acknowledge receipt of the data by incrementing the acknowledgment counter 704 as was discussed in relation to the operation 906. The effect of these various operations on the shared memory block 310 depicted in FIG. 10B is depicted in FIG. 10C.

Figure 10D:
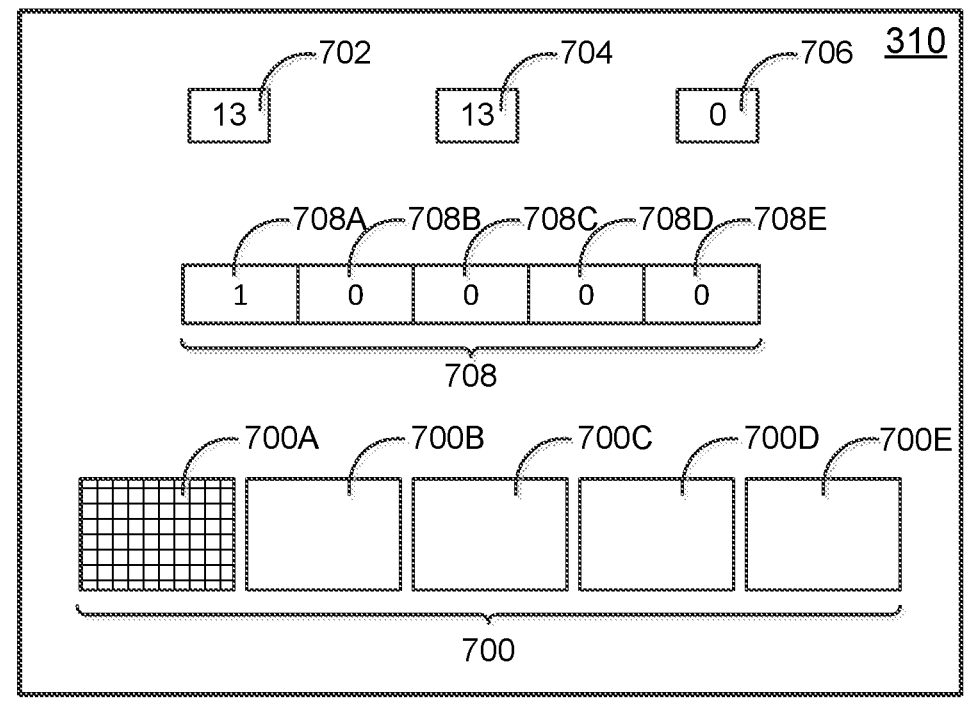

Notably, as mentioned above, once the second virtual machine 220B completes handling of data provided in a given one of the buffers of the set of buffers 700, it may return ownership of that buffer to the first virtual machine 220A by toggling to corresponding bit of the buffer ownership bitmap 708. For example, the second virtual machine 220B could return ownership of the buffer 700B to the first virtual machine 220A by toggling the value of the bit 708B. The effect of such an operation on the shared memory block 310 as depicted in FIG. 10C is depicted in FIG. 10D.

A possible example application of the methods of FIGS. 8 and 9 may be for the particular application of sharing graphics buffers between virtual machines. Shared graphics buffers may, for example, correspond to a window. For example, such a window may be associated with a first virtual machine and the shared graphics buffers may be used in presenting graphics in a windowing system of a second virtual machine and/or in processing, by the second virtual machine in some manner, the pixel data stored in the buffers.

For the purposes of explaining the example application, description will be provided referring to and in terms of primitives available in the QNX™ operating system and with the QNX™ hypervisor. Notably, however, this is by way of example and should not be considered limiting.

A suitable shared memory block may be established between peer virtual machines by reserving such as POSIX typed memory when building the image file systems (IFSs) for the virtual machines and for the host machine. This memory may be specially reserved to ensure that no applications or drivers get a mapping from the memory block (i.e., so it is exclusively used a shared memory block for communicating data between virtual machines).

Once a suitable shared memory block is established, the first virtual machine (which acts as a producer may perform operations in accordance with the method of FIG. 8) may, on start-up initialize the shared memory block such as in manners consistent with the description of initialization of the shared memory block 310 above. For example, the memory block may be initialized consistent with a layout similar to that of the data structure illustrated in FIG. 7. The first virtual machine may also take other steps such as, for example, associating buffers in the shared memory block with other data structures so as to permit rendering into those buffers. The second virtual machine may also take steps to prepare for receiving graphics data such as, for example, also associating the buffers in the shared memory block with other data structures to allow, for example, data provided thereby to be used in presenting graphics in the windowing environment of the second virtual machine.

As mentioned above, image data communicated by the first virtual machine to the second virtual machine may be used in presenting graphics in a windowing system of a second virtual machine. Additionally or alternatively, other processing may be performed on that data by the second virtual machine.

Other variations of the above described examples are possible. For example, the above description is presented in terms of communication between a pair of virtual machines. Stated differently, in the examples above, both endpoints of the communication are a virtual machine. However, as also mentioned above, the above techniques for signaling via a shared memory block may equally be applied for communication from a virtual machine to a host machine or vice-versa by way of a memory block shared between the virtual machine and the host machine. Put differently, the host machine may also be an endpoint (source or sink) of the communication. More broadly, similar techniques may be employed for communication using shared memory blocks in other contexts such as, for example, for communication between processes or threads running on the same machine, with the communication occurring by way of a memory block shared between the processes or the threads as the case may be.

It will be appreciated that it may be that some or all of the above-described operations of the various above-described example methods may be performed in orders other than those illustrated and/or may be performed concurrently without varying the overall operation of those methods.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method comprising:
providing a memory block shared between a first endpoint and a second endpoint, the shared memory block including a plurality of buffers, a posting buffer index, a post counter, and an acknowledgment counter, one of the first endpoint and the second endpoint being a virtual machine hosted by a computing device and the other of the first endpoint and the second endpoint being one of a host for the virtual machine, another virtual machine hosted by the computing device, or a host for the another virtual machine;
sending, by the first endpoint, data to the second endpoint, the sending including:
identifying one of the plurality of buffers as being currently owned by the first endpoint and storing data in that buffer;
detecting that the acknowledgment counter is equal to the post counter; and
following detecting that the acknowledgment counter is equal to the post counter, setting the posting buffer index to a value identifying said one of the plurality of buffers in which the data was stored and incrementing the post counter to signal that data has been stored for receipt by the second endpoint;
receiving, by the second endpoint, the data from the first endpoint, the receiving including:
detecting that the post counter has changed; and
following detecting that the post counter has changed, identifying, based on the posting buffer index, said one of the plurality of buffers as being the buffer storing data for receipt by the second endpoint and incrementing the acknowledgment counter to acknowledge receipt of the data.

2. The method of claim 1 wherein the shared memory block further includes a buffer ownership bitmap having bits identifying ownership of the plurality of buffers as between the first endpoint and the second endpoint and wherein identifying the one of the at least one buffers as being currently owned by the first endpoint includes determining, based on the buffer ownership bitmap, that the one of the plurality of buffers is currently owned by the first endpoint.

3. The method of claim 2 wherein the receiving further includes:
prior to incrementing the acknowledgment counter, taking, by the second endpoint, ownership of the one of the plurality of buffers by toggling the value of a bit of the buffer ownership bitmap corresponding to that buffer.

4. The method of claim 3, further comprising, the second endpoint:
after taking ownership of the one of the plurality of buffers, processing the data stored in that buffer; and
after completing processing of the data stored in the one of the plurality of buffers, releasing ownership of the one of the plurality of buffers to the first endpoint by toggling the value of the bit of the buffer ownership bitmap corresponding to that buffer.

5. The method of claim 2, further comprising:
returning, by the second endpoint, ownership of a second one of the buffers to the first endpoint by toggling a value of a bit of the buffer ownership bitmap corresponding to the second one of the buffers.

6. The method of claim 2, further comprising:
prior to detecting that the acknowledgment counter is equal to the post counter, waiting for the acknowledgment counter to be equal to the post counter, and, while waiting for the acknowledgment counter to be equal to the post counter:
identifying, based on the buffer ownership bitmap, a second one of the buffers owned by the first endpoint; and
storing further data in the second one of the buffers.

7. The method of claim 1, further comprising:
sending, by the first endpoint, further data to the second endpoint, the sending of the further data including:
identifying a second one of the buffers as being owned by the first endpoint;
storing data in the second one of the buffers;
detecting that the acknowledgment counter is equal to the post counter;
following detecting that the acknowledgment counter is equal to the post counter:
setting the posting buffer index to a value identifying the second one of the buffers; and
incrementing the post counter to signal that data has been stored for receipt by the second endpoint;
receiving, by the second endpoint, the further data from the first endpoint, the receiving including:
detecting that the post counter has changed; and
following detecting that the post counter has changed, incrementing the acknowledgment counter to acknowledge receipt of the further data.

8. The method of claim 7, wherein the shared memory block further includes a buffer ownership bitmap having bits identifying ownership of the plurality of buffers as between the first endpoint and the second endpoint and wherein the receiving of the data further includes, prior to incrementing the acknowledgment counter, taking, by the second endpoint, ownership of the one of the plurality of buffers by toggling the value of a bit of the buffer ownership bitmap corresponding to the one of the plurality of buffers, and wherein the receiving of the further data includes, prior to, incrementing the acknowledgment counter, taking, by the second endpoint, ownership of the second one of the buffers by toggling the value of a bit of the buffer ownership bitmap corresponding to the second one of the buffers.

9. The method of claim 8, further comprising:
while the second one of the buffers is owned by the second endpoint, returning, by second endpoint, ownership of the one of the plurality of buffers to the first endpoint by toggling a value of the bit of the buffer ownership bitmap corresponding to the one of the plurality of buffers.

10. The method of claim 8, further comprising:
while the one of the plurality of buffers is owned by the second endpoint, returning, by second endpoint, ownership of the second of the buffers to the first endpoint by toggling a value of the bit of the buffer ownership bitmap corresponding to the second one of the buffers.

11. The method of claim 1 wherein detecting that the post counter has changed includes periodically polling the value of the post counter to determine whether the value of the post counter has changed.

12. The method of claim 1 further comprising, prior to detecting that the acknowledgment counter is equal to the post counter, waiting for the acknowledgment counter to be equal to the post counter, wherein waiting for the acknowledgment counter to be equal to the post counter includes periodically polling the value of the acknowledgment counter to determine whether the value of the acknowledgment counter has been incremented.

13. A computer system comprising:
at least one processor; and
a physical memory storing instructions that, when executed by the at least one processor, cause a first endpoint to communicate data to a second endpoint via a portion of the physical memory shared between the first endpoint and the second endpoint, one of the first endpoint and the second endpoint being a virtual machine hosted by the computer system, and the other of the first endpoint and the second endpoint being one of a host for the virtual machine, another virtual machine hosted by the computer system, or a host for the another virtual machine, the portion of the physical memory including:
a plurality of buffer;
a posting buffer index modifiable by the first endpoint to indicate a one of the plurality of buffers in which data has been stored for communication to the second endpoint;
a post counter incrementable by the first endpoint to signal to the second endpoint that data has been made available in the one of the plurality of buffers; and
an acknowledgment counter incrementable by the second endpoint to acknowledge signaling that data has been made available in the one of the plurality of buffers.

14. The computer system of claim 13, wherein the portion of the physical memory further includes:
a buffer ownership bitmap storing bits corresponding to the buffers, the bits identifying ownership of the plurality of buffers as between the first endpoint and the second endpoint.

15. The computer system of claim 13 wherein the buffers are of a uniform size.

16. The computer system of claim 13 wherein the data communicated by the first endpoint to the second endpoint is pixel data.

17. A non-transitory computer-readable storage medium storing instructions that, when executed by a processor of a computer system, cause a first endpoint to send data to a second endpoint using a memory block shared between the first endpoint and the second endpoint, one of the first endpoint and the second endpoint being a virtual machine hosted by the computer system, and the other of the first endpoint and the second endpoint being one of a host for the virtual machine, another virtual machine hosted by the computer system, or a host for the another virtual machine, and the shared memory block including a plurality of buffer, a posting buffer index, a post counter, and an acknowledgment counter, wherein sending the data includes:
identifying one of the plurality of buffers as being currently owned by the first endpoint and storing data in that buffer;

detecting that the acknowledgment counter is equal to the post counter; and following detecting that the acknowledgment counter is equal to the post counter, setting the posting buffer index to a value identifying said one of the plurality of buffers in which the data was stored and incrementing the post counter to signal that data has been stored for receipt by the second endpoint, and wherein the medium further stores additional instructions that cause the second endpoint to receive the data from the first endpoint, wherein receiving the data includes:

detecting that the post counter has changed; and following detecting that the post counter has changed, identifying, based on the posting buffer index, said one of the plurality of buffers as being the buffer storing data for receipt by the second endpoint and incrementing the acknowledgment counter to acknowledge receipt of the data.

\* \* \* \* \*